(No Model.)
T. A. MILLER.
CARRIAGE WHEEL.
No. 247,775. Patented Oct. 4, 1881.
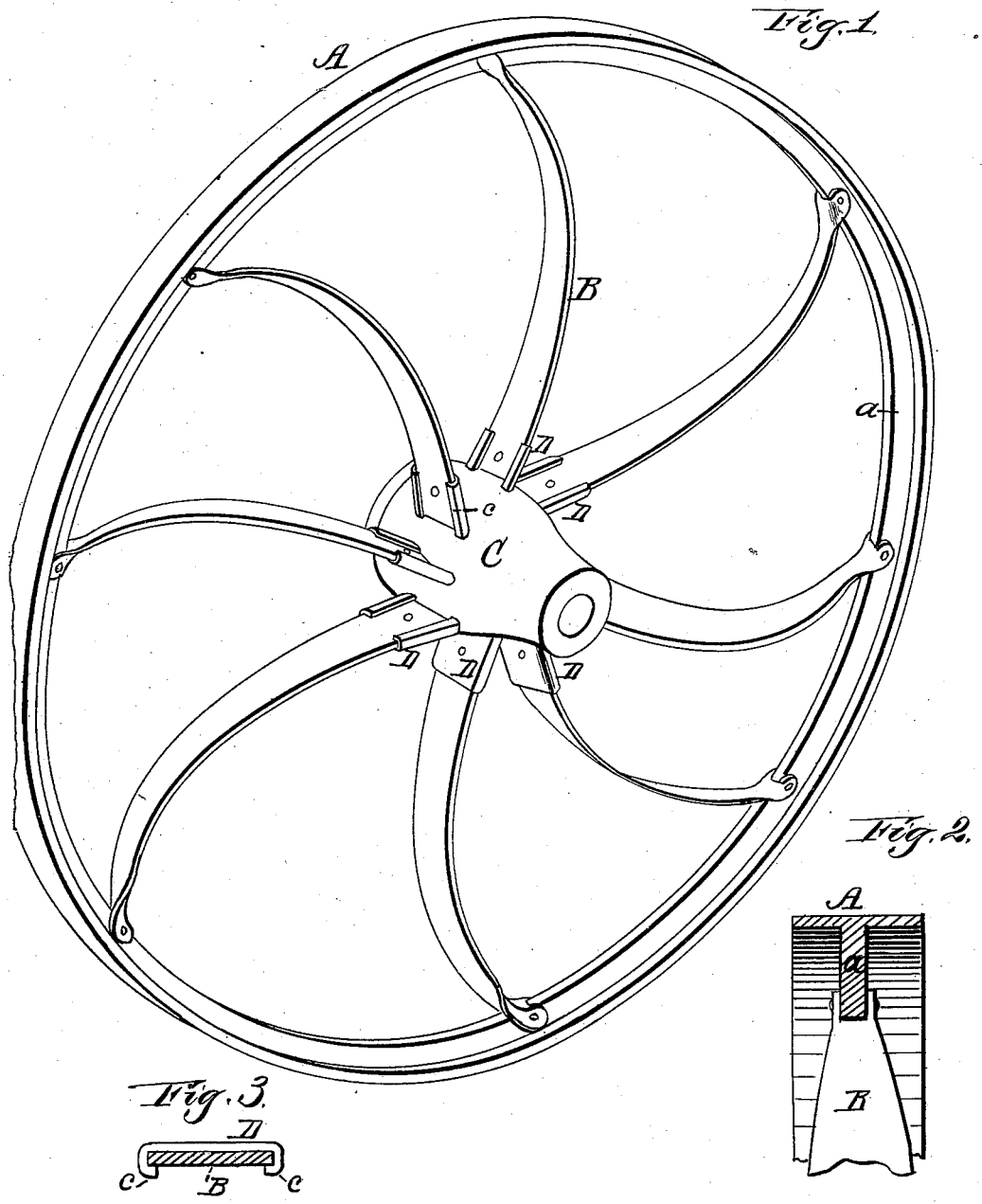

UNITED STATES PATENT OFFICE.

THOMAS A. MILLER, OF GRENOLA, KANSAS.

CARRIAGE-WHEEL.

SPECIFICATION forming part of Letters Patent No. 247,775, dated October 4, 1881.

Application filed July 16, 1881. (No model.)

*To all whom it may concern:*

Be it known that I, THOMAS A. MILLER, a citizen of the United States, residing at Grenola, in the county of Elk and State of Kansas, have invented certain new and useful Improvements in Carriage-Wheels; and I do hereby declare that the following is a full, clear, and exact description of the same, reference being had to the annexed drawings, making a part of this specification, and to the letters and figures of reference marked thereon.

Figure 1 of the drawings is a perspective view of a wheel constructed in accordance with my invention. Fig. 2 is a detail view, in section, of the rim of the wheel, showing the manner of connecting the spokes thereto. Fig. 3 is a detail view of one of the flanged arms of the hub with the spoke connected thereto in section.

The present invention has relation to certain new and useful improvements in spring-wheels for wagons and other vehicles; and it consists in the peculiar form and construction of the spokes and the manner of connecting them to the hub and rim of the wheel, substantially as shown in the drawings and hereinafter described.

In the accompanying drawings, A represents the rim of the wheel formed of T-iron, or, in other words, having an interior flange, $a$, for connecting thereto the spokes B. These spokes are formed from spring-steel and are flat, decreasing in width from the hub to the rim of the wheel. This feature is considered of great importance, as it gives greater elasticity at the periphery of the wheel, where the spring is desired. The increase in the width of the spokes B toward the hub C gives rigidity and stiffness to the wheel at that point or center of said wheel, making a very perfect and durable connection between the hub and rim of the wheel. The outer or smaller end of each spoke B is formed with ears $b$, which embrace the flange $a$, and are riveted or otherwise fastened thereto. The larger or wider ends of the spokes B are connected to the hub C in the following manner: The hub, which is of suitable metal, has a series of radial plates, D, the same being formed with flanges $c$, which embrace the edges of the spokes and prevent them from working loose, the spokes being riveted to the plates or similarly connected thereto.

The above manner of connecting the spokes to the hub renders them strong and durable, thereby producing a wheel adapted to all classes of vehicles.

One of the main features of this class of wheels is to have them light-running, as well as possessing as much spring as possible at the rim of the wheel. This increase of the springy qualities of the wheel is greatly due to the decrease in the width of the spokes from the hub to the rim, and to further add to their flexibility and elasticity the spokes are curved, as shown in Fig. 1.

Having now fully described my invention, what I claim as new, and desire to secure by Letters Patent, is—

In a spring-wheel, the rim A, having flange $a$, and the hub C, having plates D, with flanges $c$, in combination with the curved elastic spokes B, connected to the flange $a$, and plates D, substantially as and for the purpose specified.

In testimony that I claim the above I have hereunto subscribed my name in the presence of two witnesses.

THOMAS A. MILLER.

Witnesses:
JOHN D. SIMPSON,
JOHN REID.